United States Patent
Low

(10) Patent No.: US 9,798,054 B1
(45) Date of Patent: Oct. 24, 2017

(54) CAMERA ASSEMBLY FOR USE ON A VEHICLE

(71) Applicant: Delphi Technologies, Inc., Troy, MI (US)

(72) Inventor: Yew Kwang Low, Singapore (SG)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/084,880

(22) Filed: Mar. 30, 2016

(51) Int. Cl.
*H04N 5/225* (2006.01)
*G02B 5/20* (2006.01)
*G02B 3/00* (2006.01)

(52) U.S. Cl.
CPC ........... *G02B 5/208* (2013.01); *G02B 3/0043* (2013.01); *G02B 3/0062* (2013.01); *H04N 5/2252* (2013.01); *H04N 5/2253* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 2006/0104492 A1* | 5/2006 | Maase | ............... | G06K 9/00046 382/124 |
| 2009/0159788 A1* | 6/2009 | Tang | ..................... | G06F 3/0317 250/239 |
| 2011/0156187 A1* | 6/2011 | Tu | ..................... | H01L 27/14618 257/432 |
| 2013/0169801 A1* | 7/2013 | Martin | ............... | H04N 5/23206 348/143 |
| 2014/0209786 A1 | 7/2014 | Sano | | |
| 2014/0233111 A1 | 8/2014 | Teraoka | | |

FOREIGN PATENT DOCUMENTS

CN 102830486 A 12/2012
WO 2013/063014 A2 5/2013

OTHER PUBLICATIONS

Herbert Gross, et al: "Handbook of Optical Systems, vol. 3: Abberation Theory and Correction of Optical Systems", Jan. 2, 2007, pp. 377-379.

* cited by examiner

Primary Examiner — Stephen Coleman
(74) Attorney, Agent, or Firm — Lawrence D. Hazelton

(57) ABSTRACT

An illustrative example camera assembly includes a sensor. An infrared cut filter is situated to filter radiation as the radiation approaches the sensor. A plurality of lens elements is situated between the sensor and the infrared cut filter.

14 Claims, 2 Drawing Sheets

CAMERA ASSEMBLY FOR USE ON A VEHICLE

TECHNICAL FIELD

The subject matter of this disclosure generally relates to cameras. More specifically, and without limitation, the subject matter of this disclosure pertains to a camera assembly including an infrared cut filter that is useful on an automotive vehicle.

BACKGROUND OF INVENTION

Over the last several decades there have been significant changes in camera technology. The proliferation of digital cameras and advances in associated technologies has made it possible to incorporate cameras in a variety of devices. Computers and mobile communication devices, such as smartphones, routinely include cameras. It is also becoming more commonplace to provide one or more cameras on an automotive vehicle to provide enhanced features, such as a parking assist function. It would be useful to be able to provide more advanced driver assist functions that incorporate or use a camera.

One of the challenges associated with developing a camera for use on a vehicle is providing adequate image quality capability while fitting within size and cost constraints. For example, an infrared filter is useful on cameras for providing better image quality especially in daylight conditions. The known way of incorporating an infrared filter into a camera, however, presents challenges when attempting to limit the size of a camera assembly. The presence of an infrared filter tends to increase the back focal distance between a sensor and the lens element closest to that sensor. It is also difficult to limit the total track length of the camera. Some attempts to achieve a shorter total track length require introducing a relatively large number of aspherical lens surfaces, which tends to complicate the design and introduce undesired additional cost.

SUMMARY OF THE INVENTION

An illustrative example camera assembly includes a sensor. An infrared cut filter is situated to filter radiation as the radiation approaches the sensor. A plurality of lens elements is situated between the sensor and the infrared cut filter.

An illustrative example method of making a camera assembly includes supporting a plurality of lens elements within a housing. A sensor is positioned near one end of the housing. An infrared cut filter is positioned near an opposite end of the housing with the plurality of lens elements between the infrared cut filter and the sensor. The sensor is situated adjacent a circuit board substrate and the sensor and the housing are secured to the circuit board substrate using a surface mount technique.

Various features and advantages of at least one disclosed example embodiment will become apparent to those skilled in the art from the following detailed description. The drawings that accompany the detailed description can be briefly described as follows.

DETAILED DESCRIPTION

Figure 1:
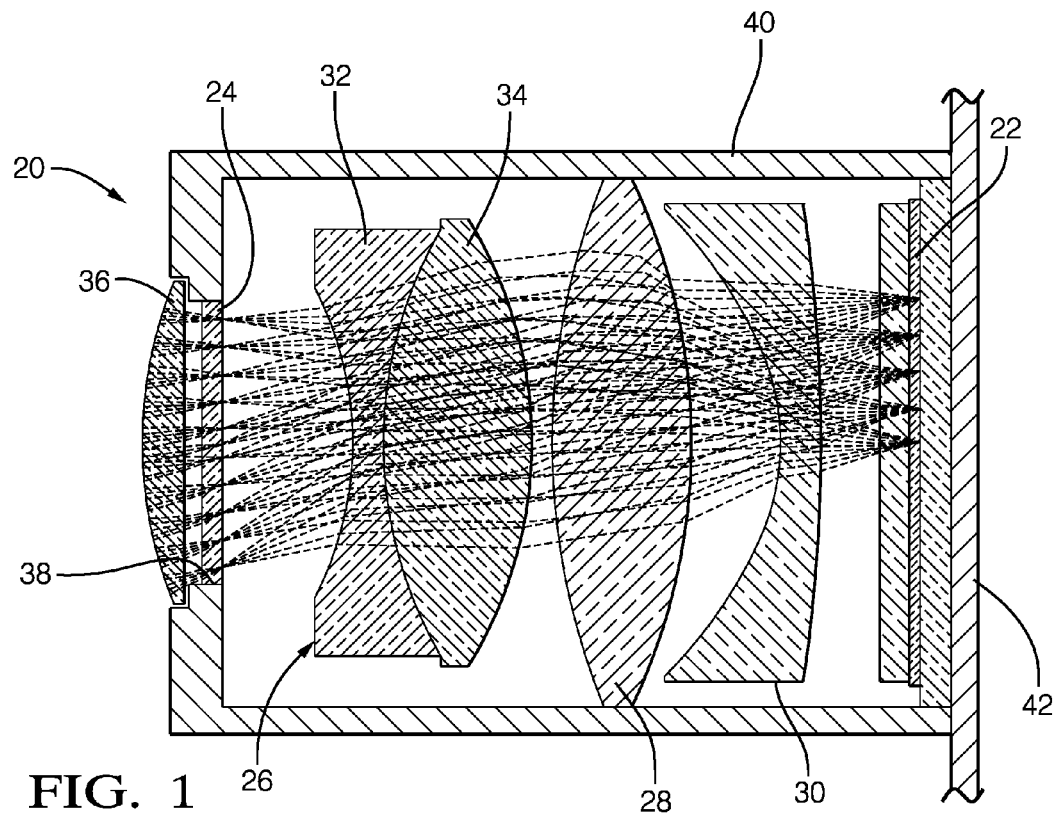
FIG. 1 schematically illustrates an example camera assembly designed according to an embodiment of this invention.

FIG. 1 schematically illustrates a camera assembly 20. A sensor 22 is configured to detect radiation and provide an output that may be processed using known techniques for generating an image. The sensor 22 may be configured for detecting radiation in the visible light spectrum, for example. Given this description, those skilled in the art will be able to select from among commercially available sensors to meet the needs of their particular situation.

An infrared cut filter 24 is situated to filter radiation as it approaches the sensor 22. The infrared cut filter 24 provides enhanced image quality by reducing the amount of infrared radiation incident on the sensor 22.

The camera assembly 20 includes a plurality of lens elements 26, 28 and 30 situated between the infrared cut filter 24 and the sensor 22. One way in which the illustrated example embodiment is different than previous camera arrangements is that the infrared cut filter 24 is spaced away from the sensor with lens elements between the infrared cut filter 24 and the sensor 22. Most camera assemblies that include an infrared cut filter position that filter immediately in front of the sensor between the sensor and the lens elements.

One feature of the plurality of lens elements is that they include only two aspherical surfaces for a high performance camera system with ⅓" format sensor at 67 lp/mm resolution. Potentially more aspherical surfaces might be needed for camera systems with larger sensor format at higher resolution. The illustrated example includes a doublet lens element 26 having a concave lens portion 32 and a convex lens portion 34. The combination of the concave lens portion 32 and the convex lens portion 34 provides color correction. The lens element 28 in this example is a convex lens and the lens element 30 is a meniscus lens. The particulars of the curvatures of the lens elements 26, 28 and 30 may be varied to change a field of view, for example, and those skilled in the art who have the benefit of this description will be able to select an appropriate lens material and lens curvatures to meet their particular needs.

The camera assembly 20 includes a front lens 36 on an opposite side of the infrared cut filter 24 from the plurality of lens elements 26, 28 and 30. In this example, the front lens 36 is a plano-convex lens element 36 with the convex surface facing forward and away from the sensor 22. Any radiation that will be detected by the sensor 22 first passes through the front lens 36, the infrared cut filter 24 and the plurality of lens elements 26, 28 and 30.

The example embodiment of FIG. 1 includes a housing 40 that contains the lens elements 26, 28 and 30, the front lens 36 and the infrared cut filter 24. The sensor 22 is also at least partially situated within the housing 40 in this example. One feature of the illustrated example is that it allows for the sensor 22 to be received adjacent a printed circuit board substrate 42 and the camera assembly 20 is then secured to the substrate 42 using a surface mount technique. The assembly process for a surface mount technique typically requires a component, such as the camera assembly 20, to be within specified size constraints so that the component and the substrate 42 may be properly situated within the machinery used for the reflow portion of the surface mount technique. The position of the infrared cut filter 24 allows for the camera assembly 20 to fit within such size constraints.

Figure 2:
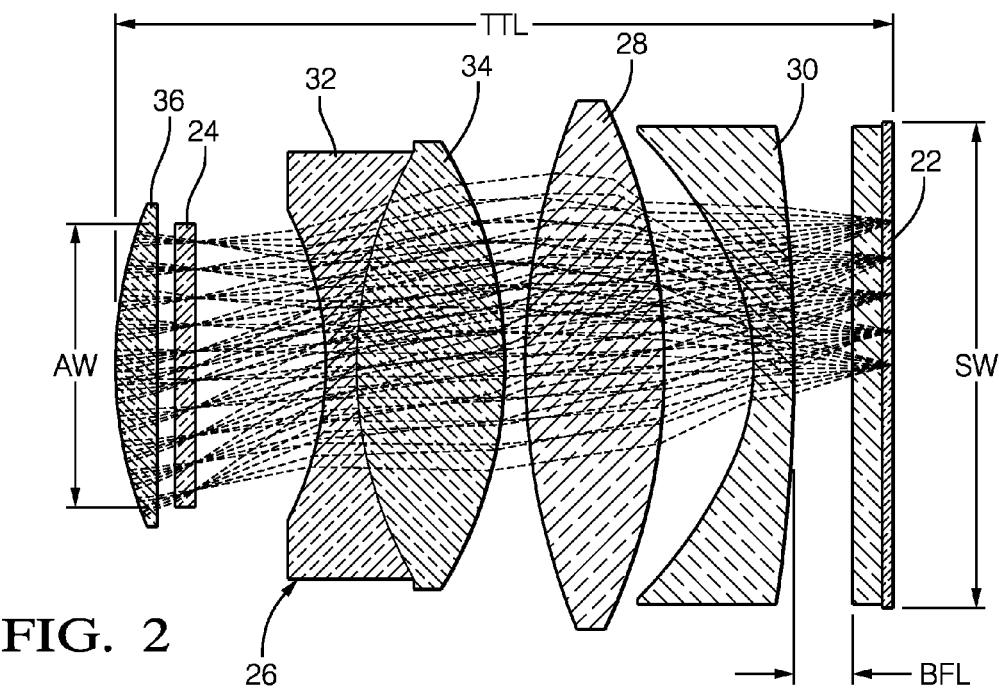
FIG. 2 schematically illustrates selected features of the example camera assembly of FIG. 1.

Referring to FIG. 2, a total track length (TTL) between a forward-most surface of the front lens 36 (e.g., the convex surface) and the sensor 22 is less than 10 mm. In one example embodiment, the TTL is 9.6 mm. Having a total track length that is less than 10 mm allows for the camera assembly 20 to be secured to a substrate such as the substrate 42 using a surface mount technique. The TTL could not fit within such size constraints if the infrared cut filter 24 were positioned between the lens element 30 and the sensor 22. That position of the infrared cut filter 24 would increase a back focal length (BFL). In the illustrated example, the BFL is less than 1.0 mm. In one particular example, the BFL is 0.7 mm. The dimension of the BFL in the illustrated example contributes to realizing a TTL and overall camera assembly dimension that allows for a surface mount technique to be used.

In the example of FIG. 2, an aperture width (AW) is approximately 3.2 mm and a sensor width (SW) is approximately 6.2 mm. One feature of the illustrated example is that it allows for having a larger aperture or smaller F#. In one example, F# is 1.65. Another feature of the illustrated example is that it allows for a lower chief ray angle, which can be less than 15° at the desired total track length.

Another feature of the illustrated example is that it allows for reducing the cost of the infrared cut filter 24 because of its location within the camera assembly 20. For example, if the infrared cut filter 24 were the last element before the sensor 22, a higher grade optic component would be required. With the illustrated arrangement, the lens elements 26, 28 and 30 focus the radiation incident on the sensor 22 after that radiation has already passed through the infrared cut filter 24.

By positioning the infrared cut filter 24 near the aperture stop 38 and having the plurality of lens elements 26, 28 and 30 between the infrared cut filter 24 and the sensor 22, a desired level of optical performance can be realized including only two aspherical surfaces and five lens elements. The overall size of the camera assembly, the total track length, and the back focal length all can be kept within size constraints that allows for the camera assembly 20 to be included in a surface mount technique assembly process. With a surface mount technique, the entire camera assembly 20 may be preassembled and more readily incorporated onto the substrate 42, which increases the quality and reliability of the final product.

Figure 3:
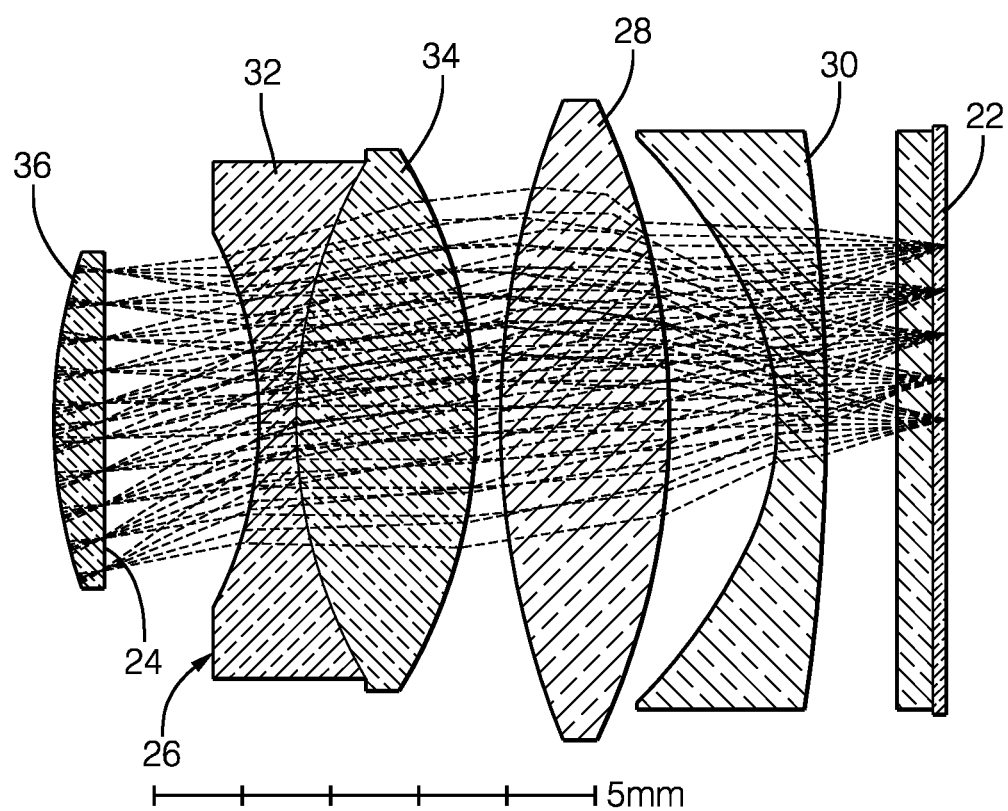
FIG. 3 schematically illustrates selected features of another example embodiment of a camera assembly.

Although schematically illustrated in FIGS. 1 and 2 as a separate element, the infrared cut filter 24 may be realized as a coating on the flat surface of the front lens 36 as shown in the example embodiment of FIG. 3. Such embodiments may provide additional space savings and reduce the complexity of the assembly by reducing the number of individual components that must be properly aligned within the camera assembly 20. With either alternative, the infrared cut filter 24 is located near the aperture stop 38 of the camera assembly 20.

The size and cost savings provided by the unique configuration of the components of the camera assembly 20 reduces cost, improves packaging considerations, and increases opportunities for additional advanced driver assistance features on a vehicle that rely upon a camera with good imaging capability.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A camera assembly, comprising:
   a sensor;
   an infrared cut filter situated to filter radiation as the radiation approaches the sensor; and
   a plurality of lens elements situated between the sensor and the infrared cut filter, wherein the plurality of lens elements comprise one doublet lens element including a convex lens portion and a concave lens portion, the doublet lens element providing color correction, and the doublet lens element is further from the sensor than at least one other of the plurality of lens elements.

2. The camera assembly of claim 1, comprising an aperture stop and wherein the plurality of lens elements are situated between the aperture stop and the sensor; and
   the infrared cut filter is situated near the aperture stop.

3. The camera assembly of claim 1, comprising
   a housing that supports the infrared cut filter and the plurality of lens elements;
   a printed circuit board substrate; and
   wherein
   the housing and the sensor are secured to the printed circuit board substrate using a surface mount technique.

4. The camera assembly of claim 1, wherein the plurality of lens elements has only 2 aspherical surfaces.

5. The camera assembly of claim 1, wherein the sensor is configured to detect radiation in the visible light spectrum.

6. A camera assembly, comprising:
   a sensor;
   an infrared cut filter situated to filter radiation as the radiation approaches the sensor; and
   a plurality of lens elements situated between the sensor and the infrared cut filter, wherein the plurality of lens elements comprise one doublet lens element including a convex lens portion and a concave lens portion, the doublet lens element providing color correction, wherein
   the plurality of lens elements includes a convex lens and a meniscus lens; and
   the convex lens and the meniscus lens are between the doublet element and the sensor.

7. A camera assembly, comprising:
   a sensor;
   an infrared cut filter situated to filter radiation as the radiation approaches the sensor; and
   a plurality of lens elements situated between the sensor and the infrared cut filter, wherein
   the infrared cut filter is a flat side of a plano-convex lens element;
   the flat side faces toward the sensor; and
   a convex side of the plano-convex lens element faces away from the sensor.

8. The camera assembly of claim 7, wherein the plano-convex lens element is a forward-most lens element of the camera.

9. A camera assembly, comprising:
   a sensor;
   an infrared cut filter situated to filter radiation as the radiation approaches the sensor;
   a plurality of lens elements situated between the sensor and the infrared cut filter;
   a front lens; and wherein
the infrared cut filter is situated between a forward most surface of the front lens and the plurality of lens elements;
the camera assembly has a total track length between the forward most surface of the front lens and the sensor; and
the total track length is less than 10 mm.

10. A camera assembly, comprising:
a sensor;
an infrared cut filter situated to filter radiation as the radiation approaches the sensor; and
a plurality of lens elements situated between the sensor and the infrared cut filter, wherein
one of the plurality of lens elements is closer to the sensor than others of the plurality of lens elements; and
a back focal distance between the sensor and the one of the plurality of lens elements is less than 1.0 mm.

11. The camera assembly of claim 10, wherein the back focal distance is 0.7 mm.

12. A method of making a camera assembly, the method comprising:
supporting a plurality of lens elements within a housing;
positioning a sensor near one end of the housing;
positioning an infrared cut filter near an opposite end of the housing with the plurality of lens elements between the infrared cut filter and the sensor;
situating the sensor adjacent a circuit board substrate;
securing the sensor and the housing to the circuit board substrate using a surface mount technique;
positioning a front lens near the infrared cut filter with the infrared cut filter between a forward most surface of the front lens and the plurality of lens elements; and
wherein
the camera assembly has a total track length between the forward most surface of the front lens and the sensor; and
the total track length is less than 10 mm.

13. A method of making a camera assembly, the method comprising:
supporting a plurality of lens elements within a housing;
positioning a sensor near one end of the housing;
positioning an infrared cut filter near an opposite end of the housing with the plurality of lens elements between the infrared cut filter and the sensor;
situating the sensor adjacent a circuit board substrate; and
securing the sensor and the housing to the circuit board substrate using a surface mount technique, wherein
one of the plurality of lens elements is closer to the sensor than others of the plurality of lens elements; and
a back focal distance between the sensor and the one of the plurality of lens elements is less than 1.0 mm.

14. The method of claim 13, wherein the back focal distance is 0.7 mm.

\* \* \* \* \*